(12) United States Patent
Fujihara et al.

(10) Patent No.: US 7,599,720 B2
(45) Date of Patent: Oct. 6, 2009

(54) PORTABLE DEVICE

(75) Inventors: Shunji Fujihara, Higashihiroshima (JP); Kazuyuki Nishimoto, Higashihiroshima (JP); Masao Fujimoto, Nara (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 609 days.

(21) Appl. No.: 11/088,198

(22) Filed: Mar. 24, 2005

(65) Prior Publication Data

US 2005/0215296 A1 Sep. 29, 2005

(30) Foreign Application Priority Data

Mar. 26, 2004 (JP) ............... 2004-093781

(51) Int. Cl.
*H04M 1/00* (2006.01)
(52) U.S. Cl. .............. 455/575.1; 455/550.1; 455/575.3; 379/433.01; 379/433.11; 379/433.13
(58) Field of Classification Search .............. 455/556.1, 455/556.2, 557, 575.3, 575.4, 550.1, 575.1, 455/575.8; 379/433.11–433.13, 433.01
See application file for complete search history.

(56) References Cited

U.S. PATENT DOCUMENTS 6,976,861 B2 * 12/2005 McWilliam et al. ......... 439/165
7,269,443 B2 * 9/2007 Park et al. ................. 455/556.2
2002/0128053 A1 * 9/2002 Jung ........................... 455/575
2003/0064685 A1 * 4/2003 Kim ............................ 455/90

FOREIGN PATENT DOCUMENTS

| EP | 1357726 A1 | 10/2003 |
|---|---|---|
| EP | 1458168 A1 | 9/2004 |
| JP | 8-294030 A | 11/1996 |
| JP | 2002-118633 A | 4/2002 |
| JP | 2002-185589 A | 6/2002 |
| JP | 2003-87376 A | 3/2003 |
| JP | 2003-229941 A | 8/2003 |
| JP | 2003-319041 A | 11/2003 |

* cited by examiner

*Primary Examiner*—Raymond S Dean
(74) *Attorney, Agent, or Firm*—Birch, Stewart, Kolasch & Birch, LLP

(57) ABSTRACT

A portable device includes: a first housing having a base, a protrusion protruded from the base, and a speaker hole provided at the protrusion; a hinge section provided to the protrusion so as to be freely moved about a rotation axis; and a second housing provided to the hinge section so as to be freely rotated about a rotation axis substantially orthogonal to the rotation axis. The hinge section has a U shape and the central part is connected to the second housing. Both-ends are branched from the central part and connected to a pair of side surfaces of the protrusion, respectively. The second housing has a first display section on at least one surface being substantially square to a connecting surface where the hinge section is connected. The portable device is capable of providing sounds associated with displays on the display section.

11 Claims, 12 Drawing Sheets

RIGHT-HANDED ROTATION ICON

SECOND HOUSING IS NOT ROTATED WITH RESPECT TO HINGE SECTION
(0-DEGREE ROTATION)

LEFT-HANDED ROTATION ICON

SECOND HOUSING IS ROTATED WITH RESPECT TO HINGE SECTION
(180-DEGREE ROTATION)

BIDIRECTIONAL ROTATION ICON

SECOND HOUSING IS ROTATED PARTWAY
(1- TO 179-DEGREE ROTATION)

PORTABLE DEVICE

This Nonprovisional application claims priority under 35 U.S.C. § 119(a) on Patent Application No. 2004/93781 filed in Japan on Mar. 26, 2004, the entire contents of which are hereby incorporated by reference.

FIELD OF THE INVENTION

The present invention relates to a portable device, more particularly, to a portable device being composed of two housings movably connected to each other.

BACKGROUND OF THE INVENTION

Conventionally, folding portable telephones having two housings connected to each other through a hinge so as to be freely opened and closed have been widely used. Generally, in a portable telephone of this type, one of the housings is provided with a display section, a receiver, and others, and the other housing has operation buttons, a microphone, and others. Only recently, the market has started for a folding portable telephone having two rotation axes that individually rotate. FIG. 14 is a perspective view illustrating a conventional folding portable telephone 101 in an opened state with two rotation axes. FIG. 15 is a perspective view illustrating the conventional folding portable telephone 101 shown in FIG. 14 in a closed state. FIG. 16 is a perspective view of the conventional folding portable telephone shown in FIGS. 14 and 15 when viewed from the direction indicated by an arrow VIII in FIG. 15.

As shown in FIGS. 14 to 16, the portable telephone 101 includes a housing 103 having a surface 103a, housings 107 and 108 provided so as to be moved in the direction indicated by an arrow 151 with respect to the housing 103, and a camera section (not shown) contained in the housing 103. The housing 107 contains a hinge unit (not shown) which connects the housings 103 and 107 so that they can be moved, and connects the housings 107 and 108 so that they can be rotated.

On the housing 103 at an end on the side having the hinge unit, hinge supporting portions 104m and 104n are provided being protruded through the surface 103a. The hinge supporting portions 104m and 104n are provided at a distance away from each other. The housing 107 is positioned between the hinge supporting portions 104m and 104n on the surface 103a. Then, the hinge supporting portions 104m and 104n, and the housing 107 are connected through the hinge unit contained in the housing 107.

The surface 103a of the housing 103 has a plurality of operation buttons 118. A surface 103b of the housing 103 located at the opposite side from the surface 103a has a speaker 122. A shooting lens 114 of the camera section is exposed on a surface 153 that is provided so as to be raised to higher level than the surface 103b. The shooting lens 114 is disposed to be next to the housing 108 in the opened state of the portable telephone 101. The camera section is disposed in a space inside the housing 103 sandwiched between the surface 103a and the surface 153. A surface 108a of the housing 108 has a main display section 116.

FIG. 17 is a perspective view of the portable telephone 101, when the housing 108 having the main display section is rotated from the state shown in FIG. 14. As shown in FIG. 17, the housing 108 is provided to be rotatable with respect to the housing 107 in the direction indicated by an arrow 152. Therefore, the surface 108a having the main display section 116 can be turned in a desired direction.

Aside from this, Japanese Laid-Open Patent Application No. 2003/229941 (Tokukaihei 2003-229941; published on Aug. 15, 2003) discloses a mobile information terminal device having sub-operation keys provided at a hinge section that connects a first housing and a second housing, the sub-operation keys being operable when the first housing and the second housing are in a closed state, aiming to improve operationality by enabling key operation regardless of whether the mobile information terminal device is an opened state or a closed state.

The above-mentioned conventional folding portable telephone with two rotation axes can be closed with the display section faced inward or exposed outward, so that the portable telephone is free from scratches on the surface when carried. Further, the display can be used even when the portable telephone is closed. Thus, a use application of the device can be expanded.

However, the conventional folding portable telephone has the problem that it is hard to hear sounds associated with displays on the display section when the portable telephone is opened, or when it is closed with the display section exposed outward. A cause of the problem is that the display section and a speaker hole are disposed on different surfaces.

SUMMARY OF THE INVENTION

An object of the present invention is to provide a folding portable device which allows for hearing of sounds associated with displays on a display section in an excellent manner.

To attain the foregoing object, the portable device of the present invention includes a first housing having a base and a protrusion protruded from one end of the base; a hinge section provided to the protrusion so as to freely move about a first rotation axis; and a second housing provided to the hinge section so as to freely rotate about a second rotation axis being substantially orthogonal to the first rotation axis, the first housing having a speaker hole provided at the protrusion, the second housing having a display section provided on at least one surface substantially parallel to the second rotation axis of the second housing.

According to this arrangement, when the portable device is opened, and when the portable device is closed with the display section exposed outward, the display section and the speaker hole can be disposed on substantially the same surface. Therefore, traveling directions of light and sound from the display section become substantially the same. Thus, it is possible to create a situation in which the user can easily hear sounds associated with displays on the display section.

For a fuller understanding of the nature and advantages of the invention, reference should be made to the ensuing detailed description taken in conjunction with the accompanying drawings.

BRIEF DESCRIPTION OF THE DRAWINGS

FIG. 13(a) is a plan view showing the state in which a "right-handed rotation icon" is displayed in the lower-left portion of the first display section. The right-handed rotation icon visually shows that the second housing is rotatable in the clockwise direction. FIG. 13(b) is a plan view showing the state in which a "left-handed rotation icon" is displayed in the lower-left portion of the first display section. The left-handed rotation icon visually shows that the second housing is rotatable in the counterclockwise direction. FIG. 13(c) is a plan view showing the state in which an icon (bidirectional rotation icon) is displayed in the lower-left portion of the first display section. The bidirectional rotation icon visually shows that the second housing is rotatable in both the clockwise and the counterclockwise directions.

DESCRIPTION OF THE EMBODIMENTS

First Embodiment

The following will describe one embodiment of the present invention with reference to the drawings.

A portable device of the present embodiment is a folding portable telephone having two housings connected so as to be freely opened and closed. The portable device of the present embodiment includes (i) a function as an audio-visual device for radio broadcasts, television broadcasts, and/or the like and (ii) a function as a portable game machine.

Figure 1:
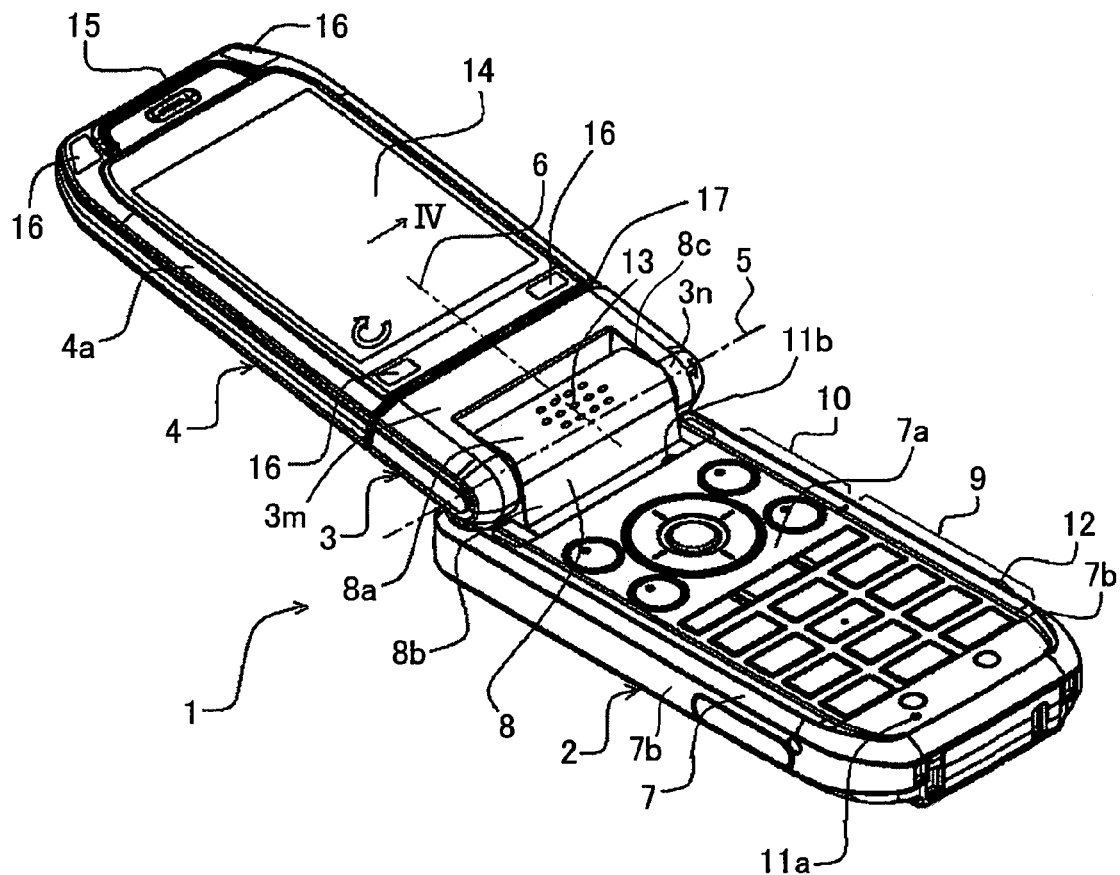
FIG. 1 is a perspective view illustrating a portable device in an opened state according to one embodiment of the present invention.
Figure 2:
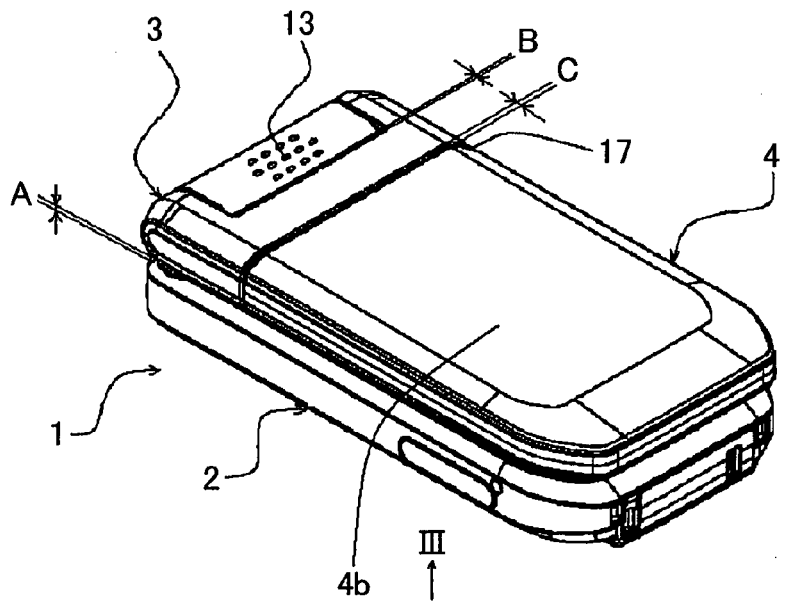
FIG. 2 is a perspective view illustrating a portable device in a closed state according to one embodiment of the present invention.
Figure 3:
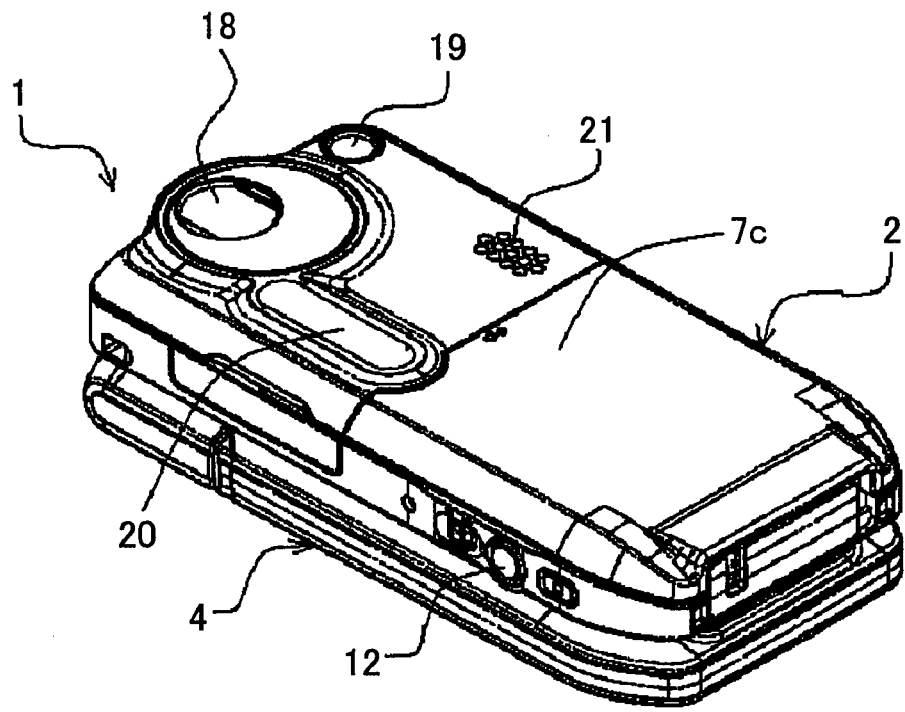
FIG. 3 is a perspective view illustrating a portable device when viewed from the direction of an arrow III in FIG. 2 according to one embodiment of the present invention.

FIG. 1 is a perspective view illustrating the portable telephone (portable device) 1 in an opened state of the present embodiment. FIG. 2 is a perspective view illustrating the portable telephone 1 in a closed state. FIG. 3 is a perspective view of the portable telephone 1 when viewed from the direction of an arrow III in FIG. 2.

As shown in FIGS. 1 to 3, the portable telephone 1 is a folding portable telephone that has a camera function and allows one housing including the camera section (not shown) of two housings to be turned over.

The portable telephone 1 includes a first housing 2, a hinge section 3 movably connected to the first housing 2 about a movement axis 5 (first rotation axis), and a second housing 4 rotatably connected to the hinge section 3 about a rotation axis 6 (second rotation axis). The first housing 2, the second housing 4, and the hinge section 3 are made of plastic resins such as an acrylonitrile butadiene styrene resin (ABS) or a polycarbonate-acrylonitrile butadiene styrene resin (PC-ABS).

The movement axis 5 and rotation axis 6 are provided to be substantially orthogonal to each other, so that the hinge section 3 and the second housing 4 can be freely moved about the movement axis 5 at any angle. Accordingly, the portable telephone 1 changes in shape between when it is in the opened state shown in FIG. 1 and in the closed state shown in FIGS. 2 and 3.

As illustrated in FIGS. 1 and 2, the first housing 2 includes (i) a base 7 having a substantially rectangular surface 7a and (ii) a protrusion 8 protruded through the surface 7a at a predetermined position thereof. The surface 7a faces outward when the portable telephone 1 is opened, while facing inward when it is closed. In other words, the surface 7a is covered (closed) with the housing 4 when the portable telephone 1 is in the closed state. Opening the portable telephone 1 turns the surface 7a to be open to the outside. The base 7 has a pair of side surfaces 7b that locate in parallel at both outer sides of the surface 7a. The side surfaces 7b are substantially orthogonal to the surface 7a.

The surface 7a has (i) input buttons 9 including keys for entering numbers and characters, and (ii) function buttons 10 for selecting various settings and functions of the portable telephone 1. These input buttons 9 and function buttons 10 have keytops made of plastic resins such as ABS or PC-ABS. The keytops of the function buttons 10 is plated with chrome or other material.

These input buttons 9 and function buttons 10 are arranged so that the buttons are free from any unintended keystrokes that could occur when the portable telephone 1 is opened or closed and when pressure is applied to the portable telephone while the portable telephone 1 is closed. More specifically, the portable telephone 1 is designed to have a gap A between the first housing 2 and the second housing 4 when the portable telephone 1 is in the closed state.

The surface 7a has a microphone hole 11a and a microphone hole 11b respectively corresponding to a first microphone and a second microphone. The microphone hole 11a is used for a phone call in the opened state of the portable telephone 1. The microphone hole 11b is used for a phone call in the closed state of the portable telephone 1. In other words, the first microphone is disposed at a position corresponding to (associated with) the microphone hole 11a so as to obtain (receive) a voice transferred through the microphone hole 11a. Similarly, the second microphone is disposed at a position corresponding to the microphone hole 11b so as to obtain (receive) a voice transferred through the microphone hole 11b.

The microphone hole 11a is disposed at one end opposed to (facing) an end where the protrusion 8 is provided. The microphone hole 11b is disposed in the vicinity of the protrusion 8. The microphone hole 11b is disposed to face a central part 3m when the portable telephone 1 is closed by movement of the hinge section 3 with respect to the first housing 2 about the movement axis 5 so that the first housing 2 faces the hinge section 3 and the second housing 4. In other words, the microphone hole 11b is located midway between a gap B and a gap C shown in FIG. 2. The gap B is provided between the first housing 2 and the hinge section 3, and the gap C is provided between the hinge section 3 and the second housing 4.

The microphone hole 11b may also be located underneath the gap B provided between the first housing 2 and the hinge section 3, or underneath the gap C provided between the hinge section 3 and the second housing 4, when the portable telephone 1 is closed.

The first microphone and the microphone hole 11a corresponding to the first microphone may be removed, so that the second microphone can be used regardless of the opened state or the closed state of the portable telephone 1. Such an arrangement allows for phone calls regardless of whether the portable telephone 1 is opened or closed, without increasing its components count.

One of the side surfaces 7b has a shutter button 12 to be operated for using the camera section contained in the first housing 2.

Being next to the hinge section 3, the protrusion 8 is provided at an end of the surface 7a extending in the extended direction of the movement axis 5. The protrusion 8, positioned so as to be separated with a space from the surface 7a along the extended direction of the movement axis 5, has a surface 8a and a pair of side surfaces 8b. The surface 8a is substantially horizontal to the surface 7a. The side surfaces 8b are connected with the surface 8a at a distance from the surface 7a so as to be substantially square to the surface 7a.

The surface 8a has a first speaker hole 13 for a first speaker 24 (refer to FIG. 4), which outputs sounds such as a ringing melody at high levels.

The protrusion 8 also has a pair of side surfaces 8c connected with the surface 7a. The side surfaces 8c are both ends of the protrusion 8 in the direction of the movement axis 5. Each of the side surfaces 8c is located inner than each of the side surfaces 7b by a given distance. Therefore, the protrusion 8 is provided at the center of the end of the surface 7a with its two corners open.

The first housing 2 is connected with the hinge section 3 and the second housing 4. The hinge section 3 is provided to the protrusion 8 so as to be freely moved. The second housing 4 is provided to the hinge section 3 so as to rotate freely with respect to the hinge section 3 about the rotation axis 6. An extended line of the rotation axis 6 is orthogonal to the movement axis 5 at the center point of the protrusion 8. The center point is located where a distance from one of the side surfaces 8c and a distance from the other side surface 8c are equal.

The hinge section 3 includes the central part 3m and both-ends 3n, having a "U" shape. The central part 3m lies along with the extended direction of the movement axis 5, and the both-ends 3n lie in the direction of the rotation axis 6, extending from the both ends of the central part 3m. The hinge section 3 is positioned so that the both-ends 3n sandwich the pair of side surfaces 8c of the protrusion 8.

The hinge section 3 has a hinge unit and an antenna (not shown) contained therein. The hinge unit connects the both-ends 3n and the side surfaces 8c for free movement. Accordingly, the central part 3m and the second housing 4 are connected so as to freely move with respect to the first housing 2. Also, via the antenna, signals are transmitted to and received from a base station, for example.

The second housing 4 includes a substantially rectangular surface 4a having a notched part at its end where the hinge section 3 is connected. The surface 4a is arranged to be substantially square to a connecting surface where the hinge section 3 and the second housing 4 are connected. In other words, the surface 4a is substantially parallel to the rotation axis 6.

The surface 4a has a first display section (display section) 14. The first display section 14 is realized by a liquid crystal display or an electro luminescent (EL) display for example, and carries out display in accordance with image data provided through a display driver section.

The surface 4a also has a receiver hole 15 corresponding to a receiver used for a phone call, for example. The receiver hole 15 is disposed at one end opposed to (facing) an end where the hinge section 3 is connected. On the surface 4a, the first display section 14 is provided between the receiver hole 15 and the end where the hinge section 3 is connected.

Further, the surface 4a has operation buttons (key operation section) 16, which are used when the portable telephone 1 is closed with the first display section 14 facing outward. The operation buttons 16 are disposed at four corners of the first display section 14, respectively.

The second housing 4 has a shock-absorbing member 17 at a notched part of the end where the hinge section 3 is connected. The shock-absorbing member 17 is made of an elastic material, for example, a plastic resin such as ABS or PC-ABS, or a rubber-containing plastic resin (elastomer) such as thermoplastic-elastomer (TPE) or thermoplastic-polyester-elastomer (TPEE). TPE and TPEE have lower hardness than plated plastic resins, while maintaining their elasticity.

When the portable telephone 1 is closed with the first display section 14 facing inward (in a state where the first display section 14 faces the surface 7a of the first housing 2), an angle of the second housing 4 with respect to the hinge section 3 is defined as zero degree. Also, when the portable telephone 1 is closed with the first display section 14 facing outward (in a state where a surface 4b provided on the backside of the second housing 4 from the surface 4a (having the first display section 14) faces the surface 7a of the first housing 2), an angle of the second housing 4 with respect to the hinge section 3 is defined as 180 degrees. Under such conditions, the shock-absorbing member 17 is provided at one corner of the second housing 4 that contacts the first housing 2, when the second housing 4 is rotated by 90 degrees with respect to the hinge section 3 and then the hinge section 3 is moved toward the first housing 2.

As described above, since the shock-absorbing member 17 is made of the material having lower hardness than the materials that the first housing 2 is made of, the decrease of strength of the second housing 4 can be suppressed. Also, damage caused when the first housing 2 contacts the second housing 4 can be prevented. Note that, the material that the shock-absorbing member 17 is made of may be equal to or greater than the materials that the second housing 4 is made of, in terms of their hardness. When such materials are used, the portable telephone 1 should have an arrangement such that forces caused by pressure applied to the second housing 4 and forces caused by sliding over the second housing 4 can be reduced, for example, an arrangement in which the shock-absorbing member 17 alters its shape, or an arrangement in which the shock-absorbing member 17 moves from the second housing 4.

According to the present embodiment, a range of rotation of the second housing 4 is from 0 to 180 degrees with respect to the hinge section 3. When viewed from the top of the second housing 4 (which is on the extended line of the rotation axis 6 and on the opposite side of the second housing 4 with respect to the hinge section 3), the second housing 4 can be rotated from a 0-degree state to a 180-degree state in the clockwise (right-handed) direction, then from the 180-degree state to the 0-degree state in the counterclockwise (left-handed) direction. Therefore, the shock-absorbing member 17 is provided at one corner of the end of the second housing where the hinge section 3 is connected.

The above structure allows the second housing 4 to have minimum portion made of the lower-hardness material than the materials that the first housing 2 is made of. Thus, the decrease of strength of the second housing 4 can be suppressed. Also, twists of the signal wires (lead wires or flexible substrates), which connect the hinge section 3 and the second housing 4, can be also minimized. Further, since the user only needs to rotate the second housing 4 so that the shock-absorbing member 17 is always placed on the side of the surface 7a, the user can easily recognize a rotatable direction. Thus, rotation in a wrong direction can be restrained, so that damage to the hinge section 3 due to the rotation in a wrong direction can be prevented.

As shown in FIG. 3, a shooting lens 18 and a flash 19 are aligned on a surface 7c of the base 7. The surface 7c is located on the opposite side from the surface 7a, and the shooting lens 18 and the flash 19 are provided at a corresponding position to the protrusion 8. The flash 19 is used as an auxiliary light source when the camera section captures an image (the camera section will be described in detail). Generally, a xenon tube is used for the auxiliary light source, and currently light emitting diodes (LED) that give off red, green, and blue glows are used. White-light illumination can be obtained by emitting the LEDs of three colors simultaneously.

On the surface 7c, a second display section 20 and a second speaker hole 21 for a second speaker (not shown) are aligned in the vicinity of the shooting lens 18. The second speaker is used for outputting sounds such as a ringing melody. The second display section 20 is realized by a liquid crystal display or an EL display for example.

Figure 4:
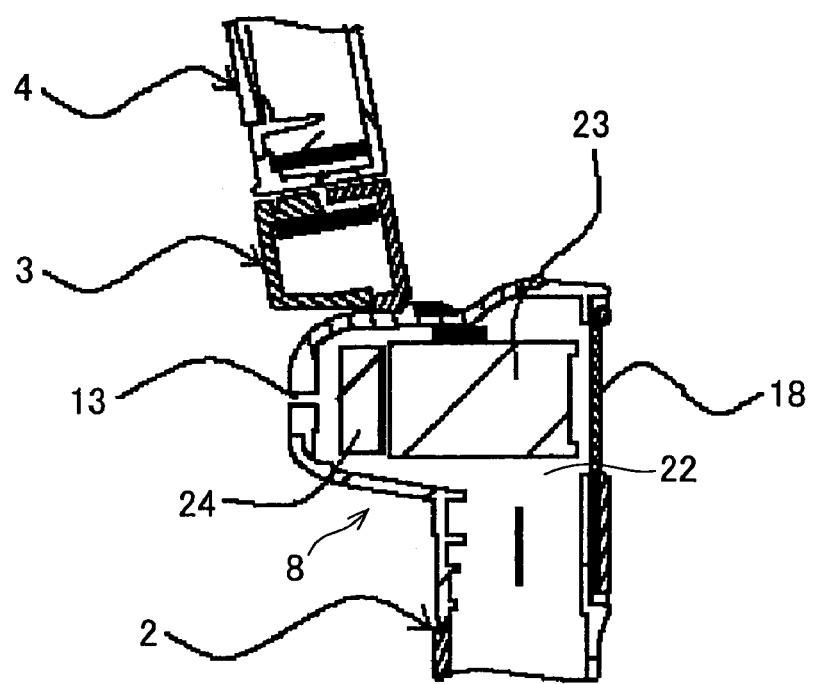
FIG. 4 is a cross-sectional view of the portable device showing a connecting section where the first housing, the hinge section, and the second housing are connected to one another when viewed from a direction IV in FIG. 1 according to one embodiment of the present invention.

FIG. 4 is a cross-sectional view of the portable telephone 1 showing a connecting section where the first housing 2, the hinge section 3, and the second housing 4 are connected to one another when viewed from a direction IV in FIG. 1. As illustrated in FIG. 4, the first housing 2 contains an internal space 22 that communicates between the protrusion 8 and the base 7. In the internal space 22, a first speaker 24 and a camera section 23 are contained. The camera section 23 locates on the backside of the shooting lens 18 and captures an incoming image from the shooting lens 18. The camera section 23 is a high-end camera with an autofocus function, a 20× digital zoom function, and a 2× optical zoom function for example. The first speaker 24 is a high-power speaker that outputs sounds of a ringing melody, radio broadcast, or TV broadcast for example.

The camera section 23 includes an image pickup device such as a charge coupled device (CCD) image sensor or a complementary metal oxide semiconductor (CMOS) image sensor, and a color filter of three colors of RGB. In the camera section 23, light reflected from a subject and incident on the shooting lens 18 is converted into three-color light through the color filter. Then, each of three RGB colors of light is incident into the CCD, respectively.

Instead of the first speaker 24, a low-output receiver used for a phone call and others may be stored in the internal space 22. According to this arrangement, a phone call is possible using this receiver and the first microphone with the portable telephone 1 in the closed state. The same effect can be obtained by electrically switching output level of the first speaker 24 between high output and low output. In this case, a circuit may be provided to prevent the first speaker 24 from reaching high output during a phone call. Thus, an auditory disorder to the user can be prevented.

Figure 5:
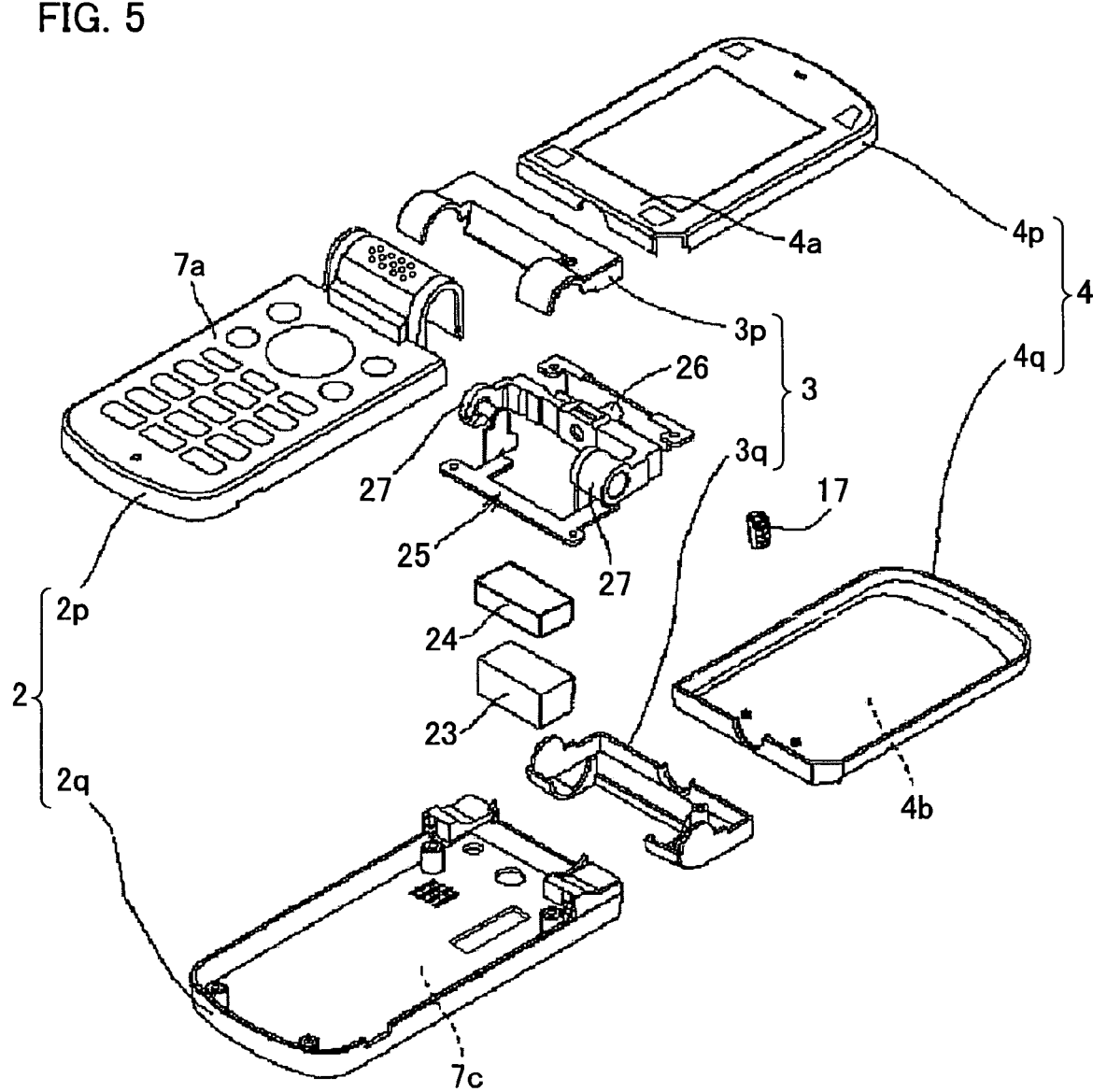
FIG. 5 is an exploded view of the portable device according to one embodiment of the present invention.

FIG. 5 is an exploded view of the portable telephone 1 shown in FIG. 1. FIG. 5 illustrates an opened portable telephone viewed from the side of the surface 7a and the surface 4a. As shown in FIGS. 4 and 5, the first housing 2 is composed of a cabinet 2p having the surface 7a and a rear cabinet 2q having the surface 7c. The second housing 4 is composed of a cabinet 4p having the surface 4a and a rear cabinet 4q having the surface 4b.

The hinge section 3 is composed of a cabinet 3p and a rear cabinet 3q. The cabinet 3p and the rear cabinet 3q are incorporated into one unit, containing a hinge unit 25 therein. The hinge unit 25 is composed of a hinge mechanism 26 and two hinge mechanisms 27. The hinge mechanism 26 connects the central part 3m and the second housing 4 to be freely rotated. The hinge mechanisms 27 connect the both-ends 3n and the side surfaces 8b to be freely moved.

The hinge unit 25 is branched from the hinge mechanism 26 into two directions. The hinge mechanisms 27 are provided at two wings of the branched hinge unit 25. The camera section 23 and the first speaker 24 are contained inside the first housing 2, locating between the two hinge mechanisms 27.

According to this arrangement, the camera section 23 and the first speaker 24 are contained in the internal space 22 that reaches the inner side of the protrusion 8 where the hinge section 3 is connected. Therefore, the first housing 2 can contain even a large camera having an optical zoom function and other functions, together with the first speaker 24, without having more protrusions but the protrusion 8 on the side of the surface 7c of the first housing 2.

As a result, compared to a case that the internal space 22 in the protrusion 8 is not used for containing the first speaker 24, that is, the case that the first speaker 24 is contained in another space but the internal space 22 in the protrusion 8, a thickness of the base 7 can be reduced. Thus, a thickness of the first housing 2 is not increased, which realizes size reduction of the portable telephone 1.

Figure 6:
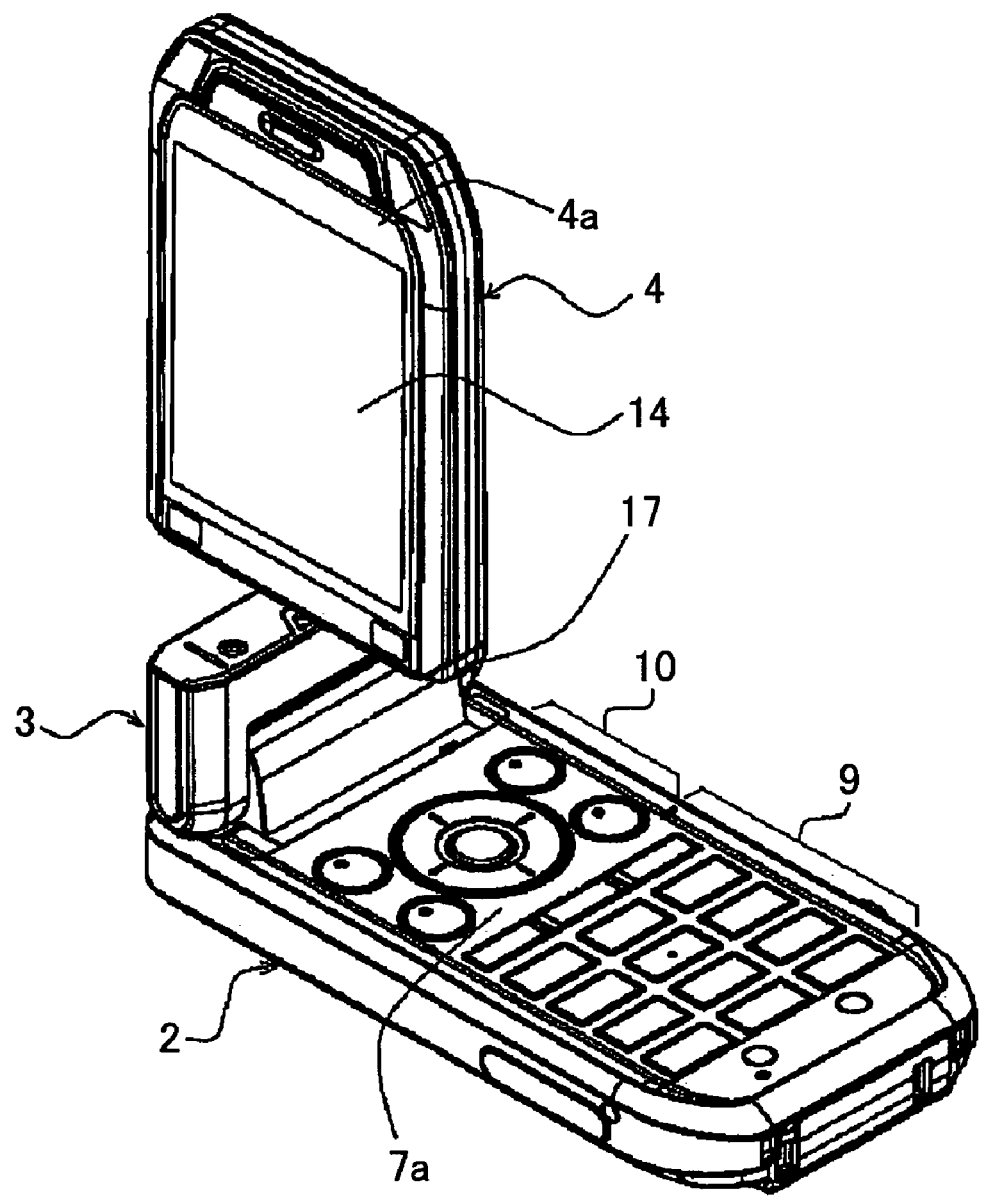
FIG. 6 is a perspective view illustrating the following state of the portable device according to one embodiment of the present invention, where the hinge section and the second housing are moved by 90 degrees with respect to the first housing from the closed state, and then the second housing is rotated by only 90 degrees with respect to the hinge section from the state shown in FIG. 1.

FIG. 6 is a perspective view illustrating the following state of the portable telephone 1. The portable telephone 1 is set to a 90-degree opened state (the hinge section 3 and the second housing 4 are moved by 90 degrees with respect to the first housing 2 about the movement axis 5 from the closed state). Then, the second housing 4 is rotated by only 90 degrees with respect to the hinge section 3 about the rotation axis 6 from the state shown in FIG. 1. In this state, the second housing 4 is positioned so that the surface 4a having the first display section 14 and the surface 7a of the first housing 2 having the input buttons 9 and the function buttons 10 become orthogonal to each other.

Figure 7:
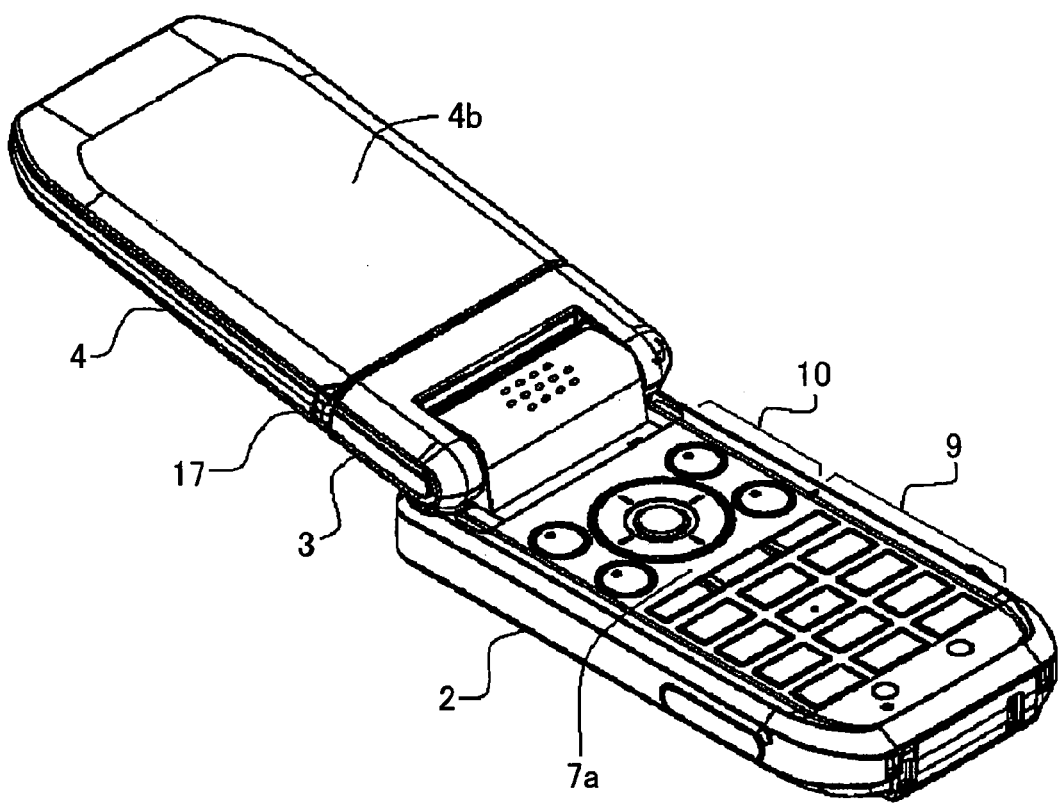
FIG. 7 is a perspective view illustrating the following state of the portable device rotated from the state shown in FIG. 6 according to one embodiment of the present invention, where the hinge section and the second housing are moved by 180 degrees with respect to the first housing from the closed state, and then the second housing is further rotated by only 90 degrees with respect to the hinge section.

FIG. 7 is a perspective view illustrating the following state of the portable telephone 1 rotated from the state shown in FIG. 6. The first portable telephone 1 is set to the 180-degree opened state (the hinge section 3 and the second housing 4 are moved by 180 degrees with respect to the first housing 2 about the movement axis 5 from the closed state). Then, the second housing 4 is rotated by further only 90 degrees with respect to the hinge section 3 about the rotation axis 6.

In this case, the portable telephone 1 is positioned so that the surface 4a of the second housing 4 and the surface 7c of the first housing 2 point in one same direction. Also, the surface 4b of the second housing 4 and the surface 7a of the first housing 2 point in the other same direction. Apart from the states shown in FIGS. 1, 6, and 7, the second housing 4 can be moved by adequate degrees about the rotation axis 6. Therefore, the first display section 14 provided on the surface 4a can be pointed to a desired direction.

In this manner, the second housing 4 of the portable telephone 1 is provided to be freely moved in two directions with respect to the first housing 2. Therefore, when the user takes a picture of a subject with the camera section 23, the user can choose the orientation of the first display section 14 in accordance with shooting conditions.

In order to take a picture of a subject that stands in front of a user, for example, the user may position the second housing 4 as shown in FIG. 1. Thus, the user can check an image of the subject displayed on the first display section 14 while aiming the shooting lens 18 at the subject. If the second housing 4 is positioned as shown in FIG. 6, the user can check an image of the subject that stands in front of the user while viewing the first display section 14 from a direction different from where the subject is.

When the user takes a picture of himself/herself, the user can position the second housing 4 as shown in FIG. 7. Thus, the user can check an image of his/her own figure displayed on the first display section 14 while aiming the shooting lens 18 at himself/herself. When the camera section 23 has a self-timer function, the user can take a picture of himself/herself standing away from the portable telephone 1. In this case, a countdown of the self-timer may be displayed on the second display section 20 shown in FIG. 3.

Figure 8:
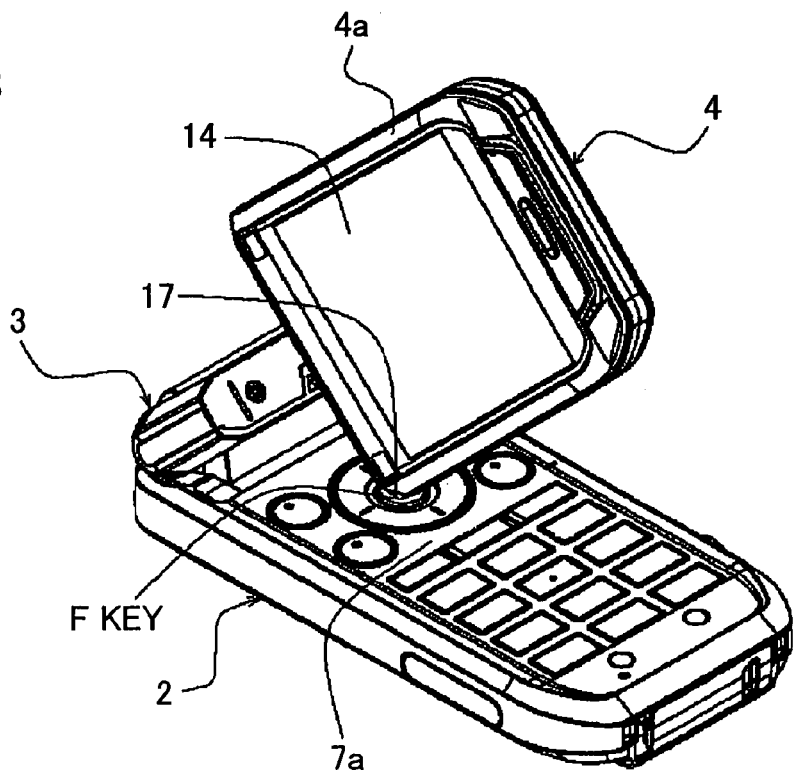
FIG. 8 is a perspective view illustrating the portable device in which the hinge section and the second housing are moved with respect to the first housing 2 from the state shown in FIG. 6 in the closing direction, according to one embodiment of the present invention.

FIG. 8 is a perspective view illustrating the portable telephone 1 in a state in which the portable telephone 1 is moved from the state shown in FIG. 6 in the closing direction (direction where the portable telephone 1 is closed about the movement axis 5). As illustrated in FIG. 8, the portable telephone 1 is closed so that the shock-absorbing member 17 provided on the second housing 4 presses an "F key" of the function buttons 10 on the surface 7a of the first housing 2. Even in this case, damage to the operation key due to the impact of the moving second housing 4 can be prevented with two reasons. One reason is that the F key is arranged to maintain high endurance because the F key is used most frequently among the function buttons 10. Another reason is that the shock-absorbing member 17 is made of a rubber-containing plastic resin such as TPE or TPEE.

When the second housing 4 is rotated about the rotation axis 6 while receiving a pressure applied about the movement axis 5 in the closing direction, the shock-absorbing member 17 provided to the second housing 4 moves in contact with the surface 7a and part of the function buttons 10 on the first housing 2. In this case, the shock-absorbing member 17 is made of the rubber-containing plastic resin such as TPE or TPEE, which has lower hardness than the materials that the surface 7a and the function buttons 10 on the first housing 2 are made of. Therefore, the surface 7a and the function buttons 10 on the first housing 2 are prevented from scratches.

Figure 9:
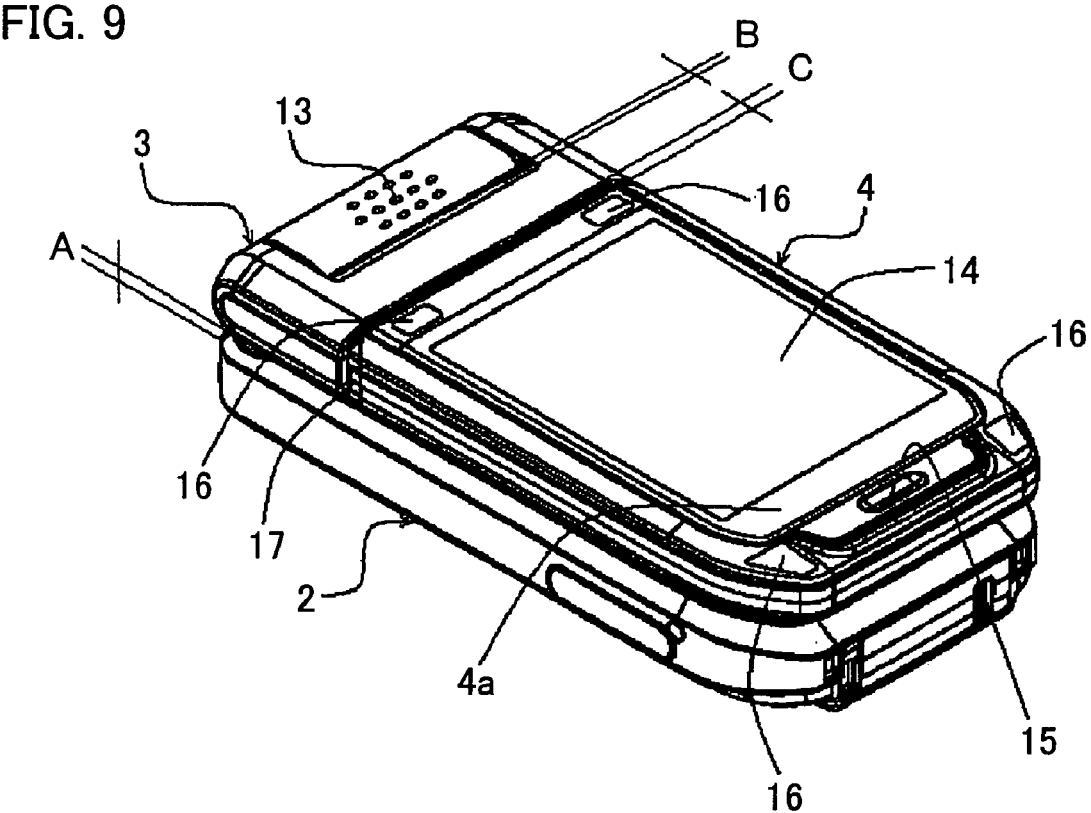
FIG. 9 is a perspective view illustrating the portable device in the closed state with the display section (the first display section) facing outward, according to one embodiment of the present invention.
Figure 10:
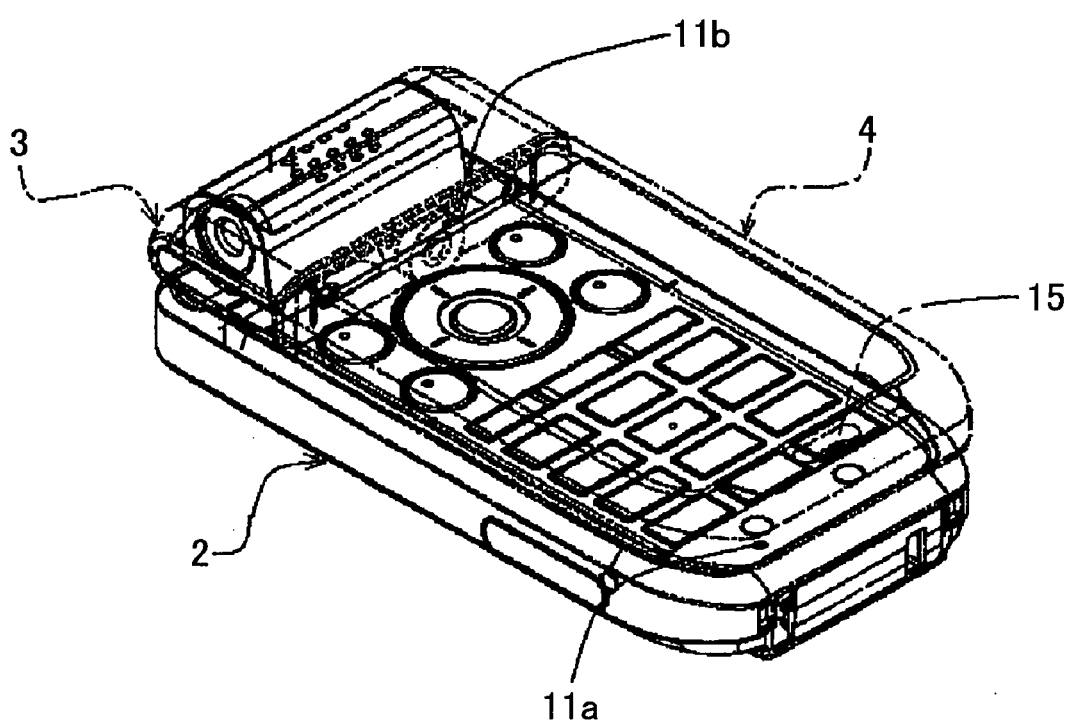
FIG. 10 is an oblique perspective view illustrating the first housing of the portable device in the closed state with the display section (the first display section) facing outward, according to one embodiment of the present invention.

FIG. 9 is a perspective view illustrating the portable telephone 1 in the closed state with the first display section 14 facing outward. FIG. 10 is an oblique perspective view illustrating the state of the first housing 2. In other words, FIGS. 9 and 10 illustrate the portable telephone 1 in the state in which the second housing 4 is moved from the state shown in FIG. 7 in the closing direction about the rotation axis 5. In this case, the portable telephone 1 can be closed so that the surface 4a having the first display section 14 and the operation buttons 16 faces outward and the surface 4b faces inward. Further, in this case, the user can put his/her forefinger of the right hand on the shutter button 12 (refer to FIG. 1) and take a picture holding the portable telephone 1 with both hands. That is, the user can hold the portable telephone 1 as a dedicated digital camera. Thus, the usability of the portable telephone 1 can be improved when it is used as a camera.

In this case, the first display section 14 and the first speaker 24 (or the speaker hole 13) can be placed on substantially the same surface. Therefore, the usability of the portable telephone 1 can be enhanced when it is used as an audio-visual device for radio broadcasts, TV broadcasts, and/or the like. Also, by using the receiver hole 15 as an audio output section, the audio output sections can be disposed on two sides; on the left and right sides of the first display section 14. Thus, stereophonic reproduction can be realized.

The user can operate the operation buttons 16 while checking the first display section 14 in the closed state of the portable telephone 1. Thus, the usability of the portable telephone 1 can be improved when it is used as a portable game machine. In this case as well, the first display section 14 and the first speaker 24 (or the speaker hole 13) can be disposed on substantially the same surface, so that the user can experience a game with excitements and realistic sensations. Instead of the first speaker 24, a cross-shape key (not shown) including four (top, bottom, left and light) keys may be placed in parallel to the first speaker 24. Thus, operationality for using the portable telephone 1 as a portable game machine may be further enhanced and its usability can be improved.

The cross-shape key (not shown) may be also provided in the vicinity of the speaker hole 13 at the protrusion 8. That is, the speaker 24 and the speaker hole 13 may be disposed at the protrusion 8, so that the cross-shape key can locate on substantially the same surface as the speaker hole 13 in the protrusion 8.

According to this arrangement, when the portable telephone 1 is closed with the first display section 14 exposed outward, the first display section 14, the speaker hole 13, and the cross-shape key can be disposed on substantially the same surface. Therefore, traveling directions of light and sound from the first display section 14 become substantially the same. Further, the user can operate the cross-shape key while viewing the first display section 14. Thus, it is possible to create a situation in which the user can easily not only operate the keys using the first display section 14, but also hear sounds associated with displays on the first display section 14.

In the closed state of the portable telephone 1, the microphone hole 11b is disposed to face the central part 3m, that is, in midway between the gap B and the gap C. The gap B is provided between the first housing 2 and the hinge section 3, and the gap C is provided between the hinge section 3 and the second housing 4. Therefore, sounds can be easily received from the gaps B and C through the gap A, and the quality of a phone call in the closed state of the portable telephone 1 can be improved.

Figure 11:
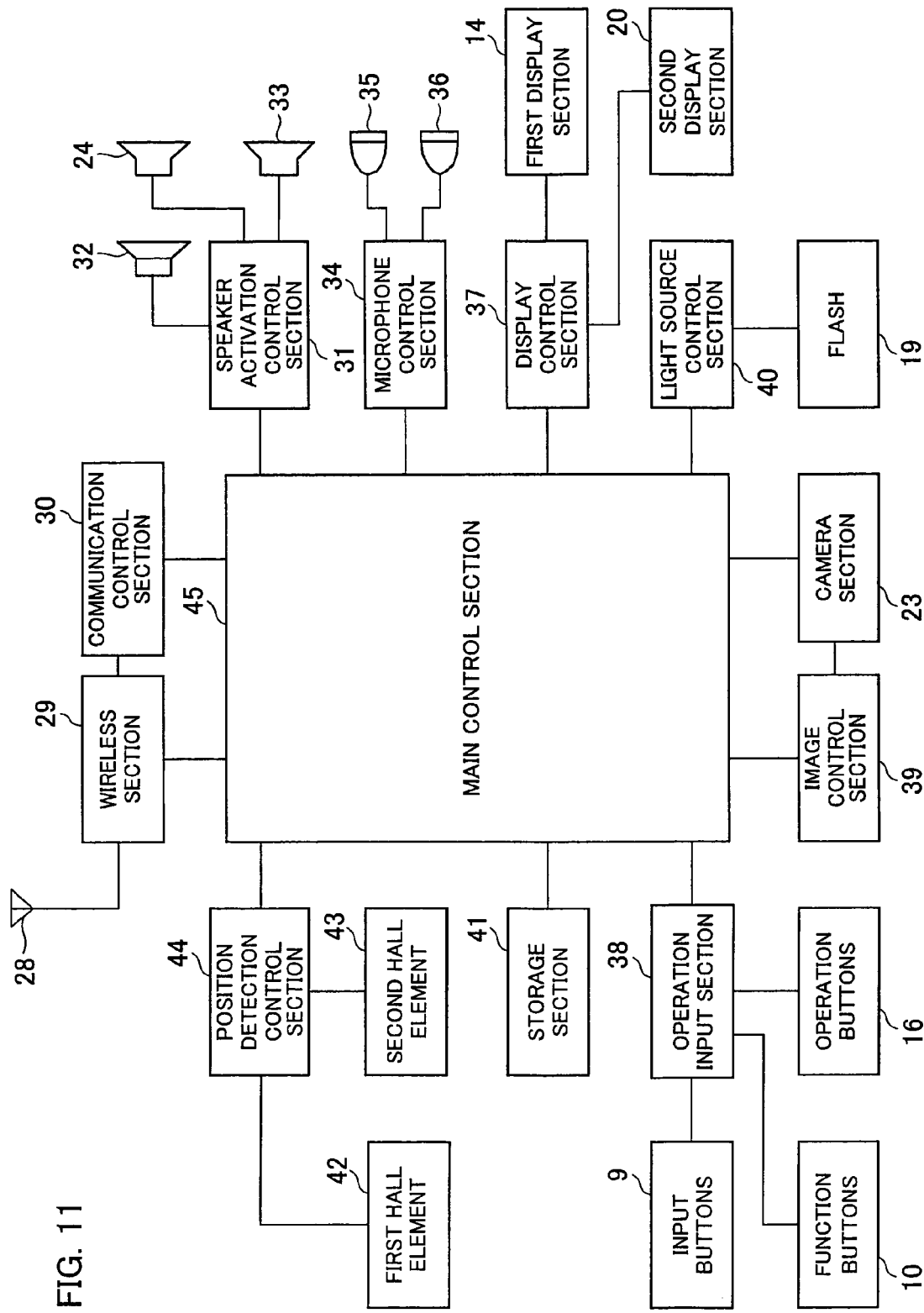
FIG. 11 is a function block diagram illustrating a schematic structure of the portable device according to one embodiment of the present invention.

Next described is an electrical structure of the portable telephone 1 with reference to FIG. 11. FIG. 11 is a function block diagram that illustrates a schematic structure of the portable telephone 1. As shown in FIG. 11, the portable telephone 1 includes an antenna 28, a wireless section 29, a communication control section 30, a speaker activation control section 31, a receiver 32, the first speaker 24, a second speaker 33, a microphone control section 34, a first microphone 35, a second microphone 36, a display control section 37, the first display section 14, the second display section 20, an operation input section 38, the input buttons 9, the function buttons 10, the operation buttons 16, the camera section 23, an image control section 39, a light source control section 40, the flash 19, a storage section 41, a first hall element 42, a second hall element 43, a position detection control section 44, and a main control section 45.

The wireless section 29 performs transmission and reception of communication data communicated with base stations or other communication devices through the antenna 28. The wireless section 29 can also receive radio broadcasts and/or TV broadcasts. The communication control section 30 performs various types of controls for communications. The communication control section 30 controls, for example, reception of radio broadcasts and/or TV broadcasts, transmission and reception for downloading an application program (e.g. game program) on a web site from a web server, outgoing calls, calls in progress, incoming calls, and transmission and reception of emails.

The speaker activation control section 31 controls activation of the receiver 32, the first speaker 24, and the second speaker 33 during audio output. Activation of the first speaker 24 and the second speaker 33 are switched, in accordance with a detection result of a terminal's position detected by the position detection control section 44 or usage status of various functions of the portable telephone 1.

The microphone control section 34 controls input of voice signals fed from the first microphone 35 and the second microphone 36 during a phone call. The microphone control section 34 switches between input from the first microphone 35 and input from the second microphone 36 (selection on either the first microphone 35 or the second microphone 36 to be activated) in accordance with the detection result of the terminal's position detected by the position detection control section 44.

The display control section 37 controls switching displays to be shown on the first display section 14 and the second display section 20. Switching the displays is performed in accordance with the detection result of the terminal's position detected by the position detection control section 44. The operation input section 38 performs inputs in accordance with key operations of the input buttons 9, the function buttons 10 and the operation buttons 16.

The image control section 39 expands image data captured by the camera section 23 or image data read out from the storage section 41 into display data, and also compresses them in JPEG data. The light source control section 40 controls light emission from the flash 19.

The position detection control section 44 is position detection means for detecting what terminal state the portable telephone 1 is in. That is, in accordance with ON or OFF state of the first and the second hall elements 42 and 43, the position detection control section 44 determines whether the portable telephone 1 is closed, and whether the second housing 4 is at the 0-degree state with respect to the hinge section 3. Accordingly, the terminal's position is automatically detected, so that inputting or outputting sounds or image displays can be switched automatically. The first and the second hall elements 42 and 43 are provided in the first housing 2, the second housing 4, or the hinge section 3. Thus, the first and the second hall elements 42 and 43 are turned on/off when attractive power of a magnet provided on the other housing, which faces the first and the second hall elements 42 and 43, is detected.

Figure 12:
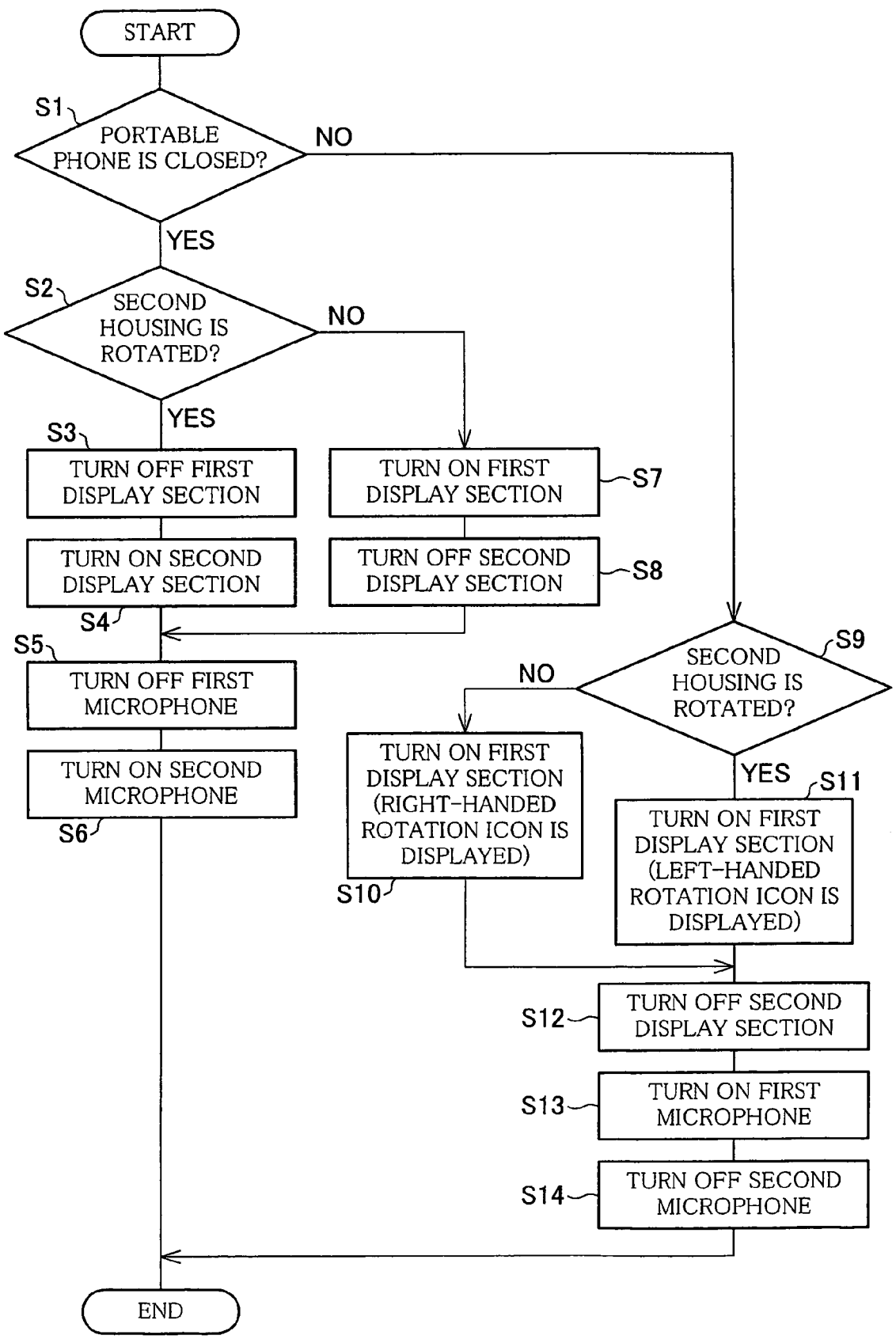
FIG. 12 is a flow chart showing the flow of control operations for switching of audio inputs and displays in the portable device according to one embodiment of the present invention.

With reference to FIG. 12 and FIG. 13(a) to FIG. 13(c), next described are control operations for switching of audio inputs and displays, associated with opening/closing of the portable telephone 1 and rotation of the second housing 4. FIG. 12 is a flow chart showing the flow of control operations for switching of audio inputs and displays in the portable telephone 1.

During power-on conditions, (e.g. during a standby, during a phone call in progress, or while the user is watching and listening to TV), the main control section 45 monitors a detection signal from the position detection control section. Under such a condition, when the position detection control section detects a change in position of the portable telephone 1, the main control section 45 performs switching of audio inputs and displays in accordance with the detection signal fed from the position detection control section.

More specifically, the main control section 45 causes the position detection control section to detect whether or not the second housing 4 and the hinge section 3 form an angle of zero degree with respect to the first housing 2, that is, whether or not the portable telephone 1 is closed (step S1). If the portable telephone 1 is closed, the main control section 45 causes the position detection control section to detect whether or not the second housing 4 is rotated with respect to the hinge section 3 (step S2).

If the second housing 4 has been rotated with respect to the hinge section 3, the main control section 45 controls the display control section 37 to turn off the first display section 14 (step S3) and turn on the second display section 20 (step S4). Further, the main control section 45 causes the microphone control section 34 to turn off (inactivate) the first microphone (step S5) and turn on (activate) the second microphone (step S6). Then, the main control section 45 terminates the control operations for switching of the audio inputs and displays.

On the other hand, in step S2, if the second housing 4 has not been rotated with respect to the hinge section 3, that is, if the position detection control section detects that the portable telephone 1 has been closed with the second housing 4 rotated by 180 degrees with respect to the hinge section 3, the main control section 45 controls the display control section 37 to turn on the first display section 14 (step S7) and turn off the second display section 20 (step S8). Then, the main control section 45 performs steps S5 and S6 and terminates the control operations for switching of audio inputs and displays.

In step S1, when the portable telephone 1 has not been closed, the main control section 45 causes the position detection control section to detect whether or not the second housing 4 is rotated with respect to the hinge section 3 (step S9). In other words, the position detection control section detects whether or not the portable telephone 1 is opened with the second housing 4 forming an angle of zero degree with respect to the hinge section 3.

When the second housing 4 has not been rotated with respect to the hinge section 3, the main control section 45 controls the display control section 37 to turn on the first display section 14 and to display a "right-handed rotation icon" in part of the first display section 14 (e.g. in the lower-left portion of the display). The right-handed rotation icon visually shows that the second housing 4 can be rotated in the clockwise direction. FIG. 13(a) is a plan view illustrating the state in which the right-handed rotation icon is displayed in the lower-left portion of the first display section 14.

Further, the main control section 45 not only turns off the second display section 20 (step S12), but also controls the microphone control section 34 to turn on the first microphone (step S13) and turn off the second microphone (step S14). Then, the main control section 45 terminates the control operations for switching of audio inputs and displays.

Figure 13:
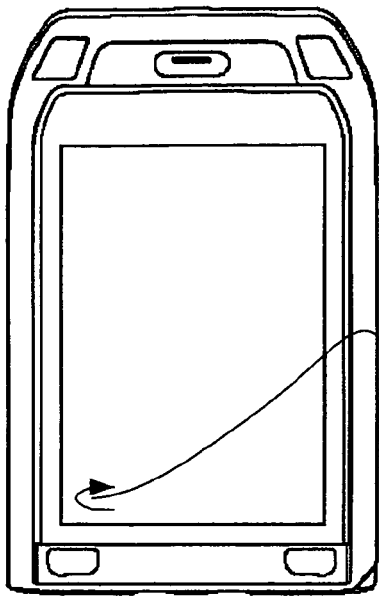
FIGS. 13(a) to 13(c) are explanatory drawings illustrating examples of image displays of the portable telephone shown in FIG. 1.
Figure 13:
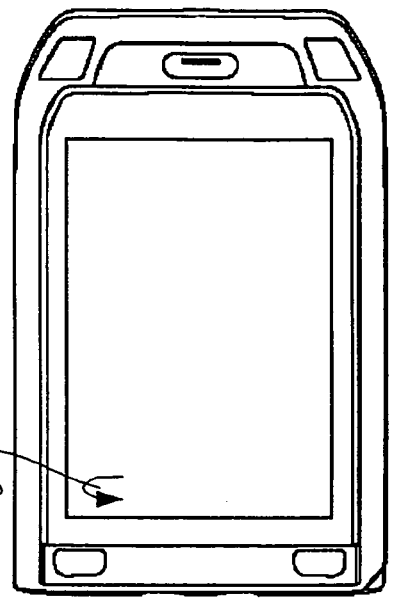
Figure 13:
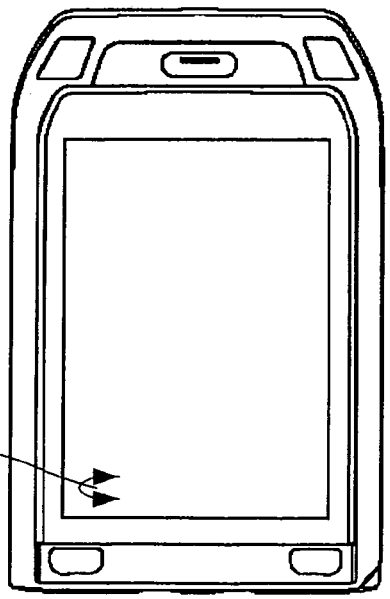
Figure 14:
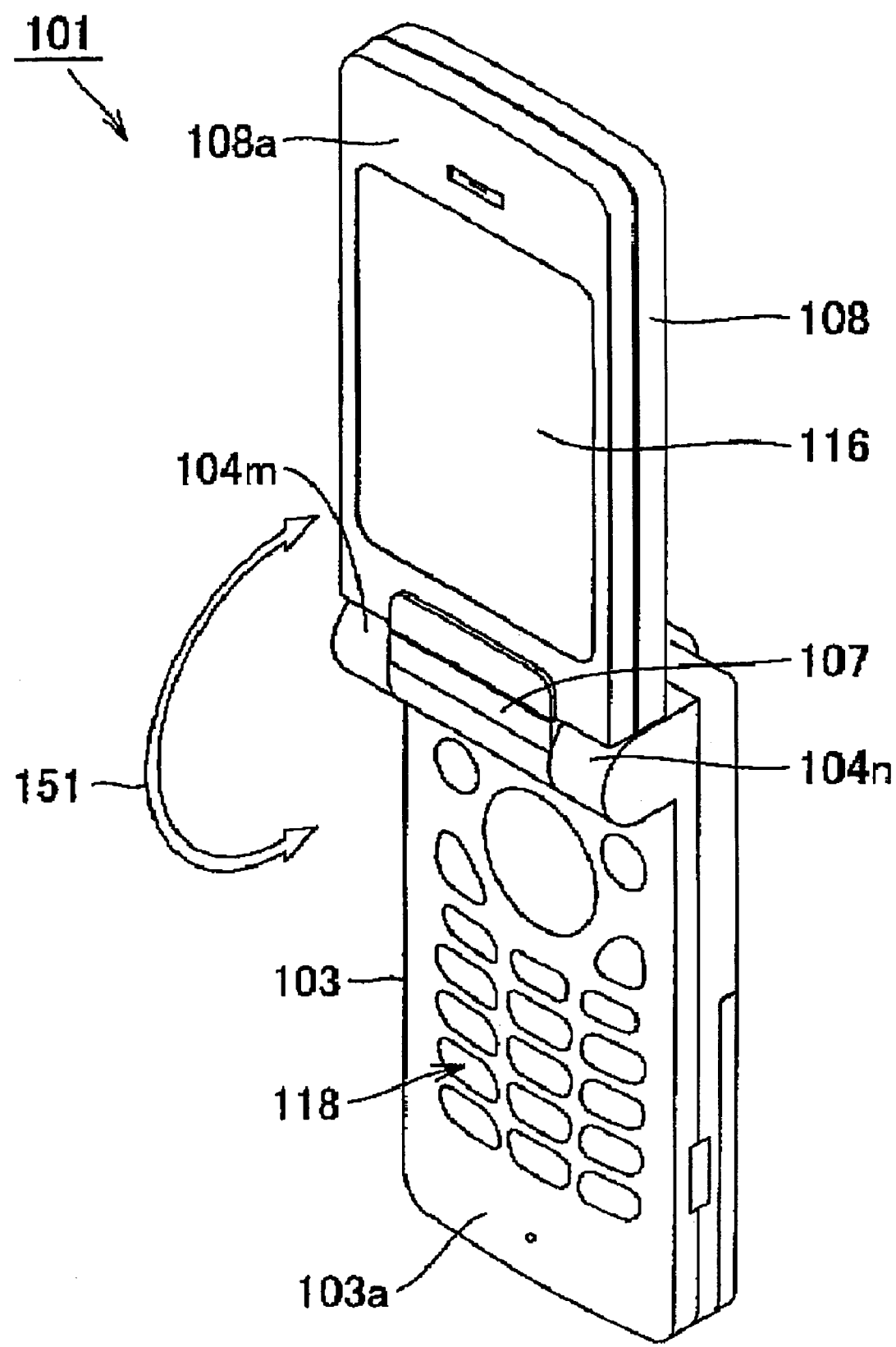
FIG. 14 is a perspective view illustrating a conventional folding portable telephone in an opened state with two rotation axes.
Figure 15:
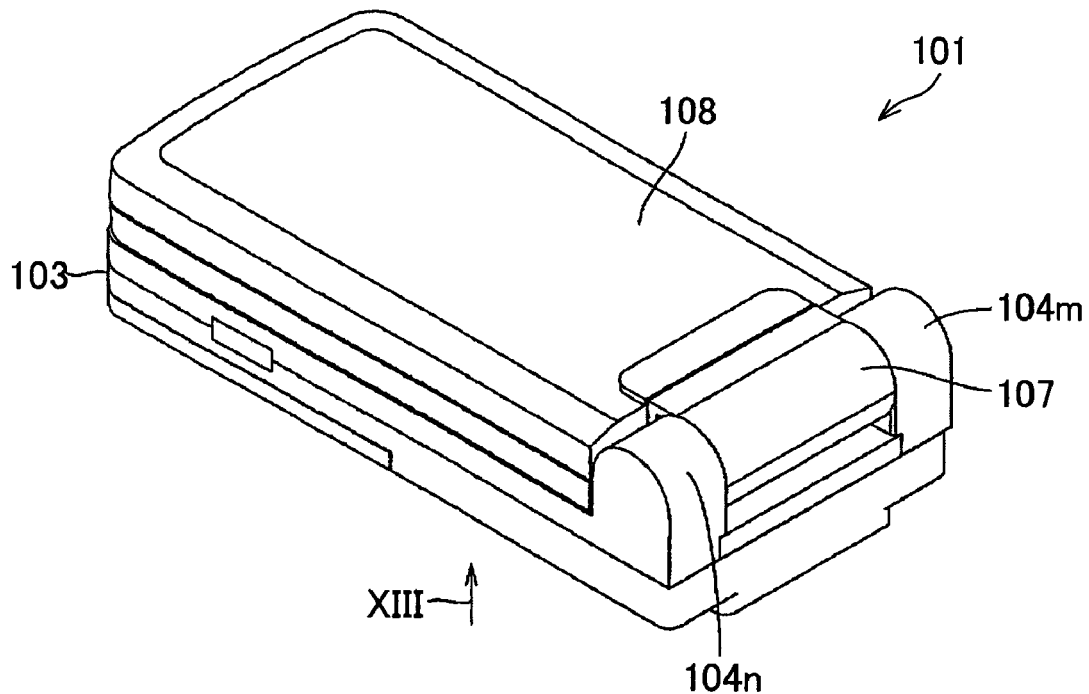
FIG. 15 is a perspective view illustrating the portable telephone shown in FIG. 14 in a closed state.
Figure 16:
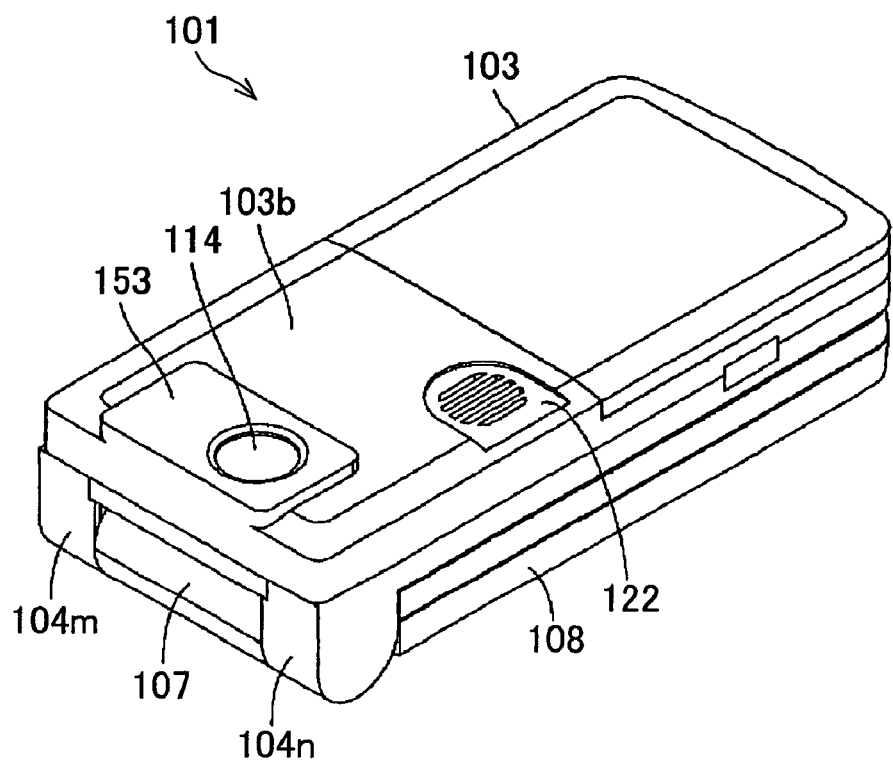
FIG. 16 is a perspective view of the portable telephone when viewed from the direction indicated by an arrow VIII in FIG. 14.
Figure 17:
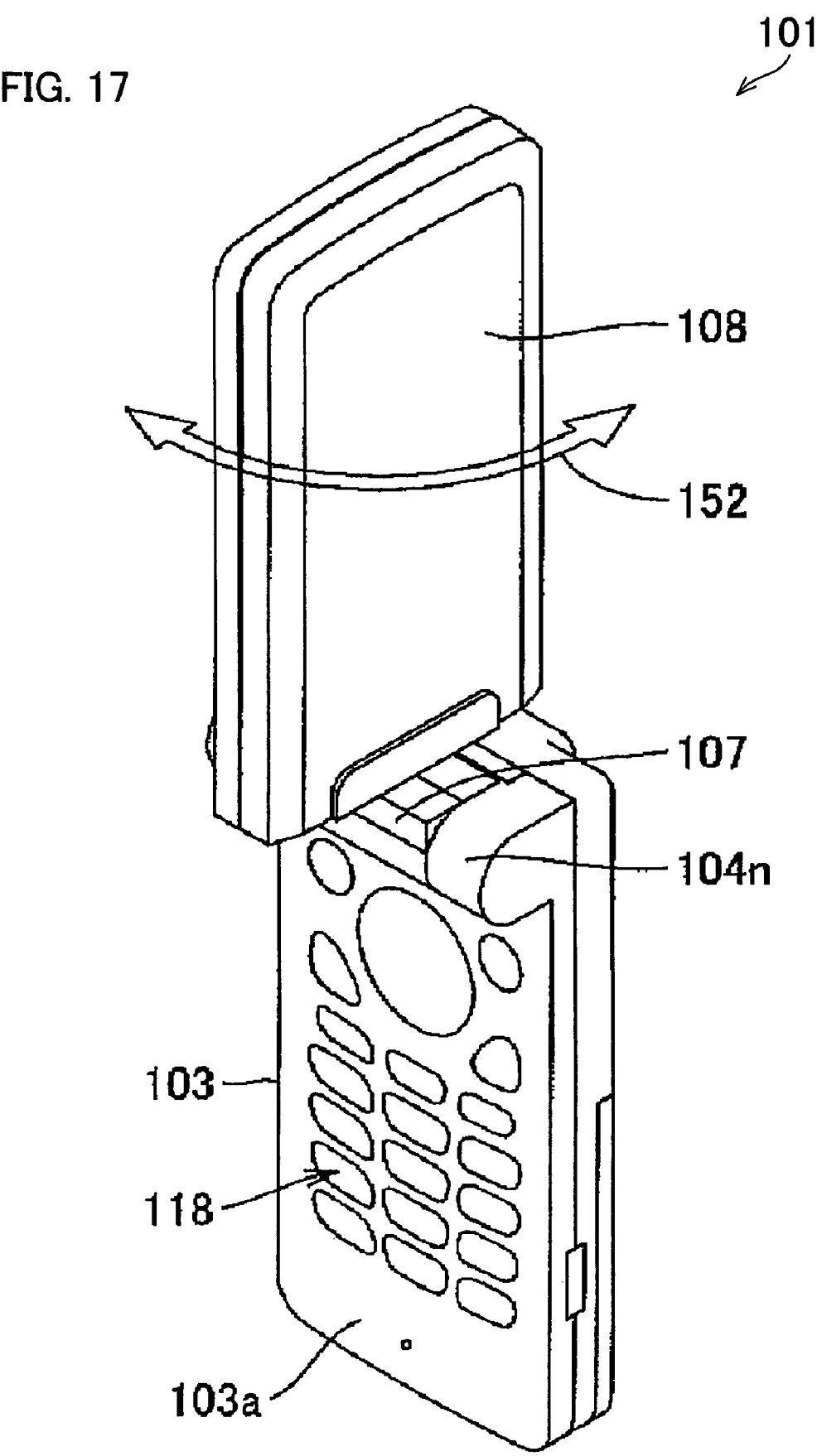
FIG. 17 is a perspective view of the portable telephone when the housing having the main display section shown in FIG. 14 is rotated.

On the other hand, in step S9, when the second housing 4 has been rotated with respect to the hinge section 3, that is, when the position detection control section detects that the portable telephone 1 is opened with the second housing 4 rotated through 180 degrees with respect to the hinge section 3, the main control section 45 controls the display control section 37 to turn on the first display section 14. Also, the main control section 45 displays a "left-handed rotation icon" in part of the first display section 14 (e.g. in the lower-left portion of the display). The left-handed rotation icon visually shows that the second housing 4 can be rotated in the counterclockwise direction. FIG. 13(*b*) is a plan view illustrating the state, in which the left-handed rotation icon, is displayed in the lower-left portion of the first display section 14.

Further, the main control section 45 not only turns off the second display section 20 (step S12), but also controls the microphone control section 34 to turn on the first microphone (step S13) and turn off the second microphone (step S14). Then, the main control section 45 terminates the control operations for switching of audio inputs and displays.

In this manner, when the portable telephone 1 is opened, the icon is displayed to visually show a rotatable direction of the second housing 4 in part of the first display section 14 (e.g. in the lower-left portion of the display). Thus, the user can easily recognize a rotatable direction, which prevents the user from rotating the second housing 4 in a wrong direction. Therefore, damage to the hinge, caused when the second housing 4 is rotated in a wrong direction, can be prevented. Furthermore, in the present embodiment, as described above, the user can recognize a rotatable direction of the second housing 4, based on the position of the shock-absorbing member 17. Thus, viewability of a rotatable direction is further increased.

The icon may be displayed on the second display section 20 to show a rotatable direction of the second housing 4. Thus, when the portable telephone 1 is opened with the second housing 4 rotated through 0 degree with respect to the hinge section 3, and even when the portable telephone 1 is viewed from the side of the surface 7*c* of the first housing 2, the user can recognize a rotatable direction of the second housing 4. Therefore, damage to the hinge, caused when the second housing 4 is rotated in a wrong direction, can be further prevented.

A display section may be provided instead of the first speaker hole 13, for example, so as to display the icon that visually shows a rotatable direction of the second housing 4. Thus, when the portable telephone 1 is opened with the second housing 4 rotated through 180 degrees with respect to the hinge section 3, and even when the portable telephone 1 is viewed from the side of the surface 7*a* of the first housing 2, the user can recognize a rotatable direction of the second housing 4. Therefore, damage to the hinge, caused when the second housing 4 is rotated in a wrong direction, can be further prevented.

As to the icons that visually show rotatable directions of the second housing 4, switching from one icon to another for display may be carried out instantly when the portable telephone 1 is opened or closed. Switching from one icon to another for display may not be carried out instantly while the second housing 4 is rotated. As an example, while the second housing 4 is rotated partway (1 to 179 degrees), the display of the currently displayed icon is maintained. When rotation of the second housing 4 is completed (0 or 180 degrees), an icon corresponding with the condition of the portable telephone 1 may be displayed. This arrangement prevents the user from misunderstanding a rotatable direction when the second housing 4 is rotated partway, so that the user can rotate the second housing 4 in an initially desired direction without a fail.

When the second housing 4 is rotated partway (1 to 179 degrees), both left-handed and right-handed rotations of the second housing 4 are possible. In this state, the right-handed rotation icon and the left-handed rotation icon may not be displayed. Alternatively, as shown in FIG. 13(*c*), an icon may be displayed to visually show that both the left-handed and right-handed rotations are possible (bidirectional rotation icon).

In the present embodiment, descriptions are given based on the folding portable telephone 1. However, the portable device of the present invention is not limited to this. The present invention is applied to other folding portable devices, such as folding personal handy phone system (PHS®), folding personal digital assistants (PDA), folding notebook computers, and folding word processors.

To attain the foregoing object, a portable device includes a first housing having a base and a protrusion protruded from one end of the base; a hinge section provided to the protrusion so as to freely move about a first rotation axis; and a second housing provided to the hinge section so as to freely rotate about a second rotation axis being substantially orthogonal to the first rotation axis, the first housing having a speaker hole provided at the protrusion, the second housing having a display section provided on at least one surface substantially parallel to the second rotation axis of the second housing.

According to this arrangement, when the portable device is opened, and when the portable device is closed with the display section exposed outward the display section and the speaker hole can be disposed on substantially the same surface. Therefore, traveling directions of light and sound from the display section become substantially the same. Thus, it is possible to create a situation in which the user can easily hear sounds associated with displays on the display section.

In addition to the above arrangement, the portable device of the present invention may be arranged such that the first housing has a speaker in an inner space that communicates between the base and the protrusion.

According to this arrangement, the speaker is contained in the internal space that communicated between the base and the protrusion where the second housing is connected. Therefore, compared to a case that the internal space in the protrusion is not used for containing the speaker, that is, the case that the speaker is contained in another place but the internal space in the protrusion, a thickness of the base can be reduced. Thus, size reduction of the portable device can be realized.

In addition to the above arrangement, the portable device of the present invention may be arranged such that the first housing has (i) a shooting lens on an opposite surface of the first housing from a surface having the protrusion, and (ii) a camera section, provided between the speaker and the shooting lens, for capturing an image provided from the shooting lens.

According to this arrangement, the speaker and the camera section are contained in the internal space that communicates between the base and the protrusion where the second housing is connected. Therefore, compared to a case that the internal space in the protrusion is not used for containing the speaker and the camera section, a thickness of the base can be reduced. Thus, the speaker and the camera section can be contained, which realizes size reduction of the portable device with an imaging function.

In addition to the above arrangement, the portable device of the present invention may be arranged such that the second housing has a key operation section on a same surface as a surface having the display section.

According to this arrangement, when the portable device is closed with the display section exposed outward the display section, the speaker hole, and the key operation section can be disposed on substantially the same surface. Therefore, traveling directions of light and sound from the display section become substantially the same, and the user can operate the keys while viewing the display section. Thus, it is possible to create a situation in which the user can easily operate the keys using the display section and hear sounds associated with displays on the display section.

In addition to the above arrangement, the portable device of the present invention may be arranged such that the first housing has a cross-shape key provided at the protrusion.

According to this arrangement, when the portable device is closed with the display section exposed outward, the display section, the speaker hole, and the cross-shape key can be disposed on substantially the same surface. Thus, traveling directions of light and sound from the display section become substantially the same, and the user can operate the cross-shape key while viewing the display section. Thus, it is possible to create a situation in which the user can easily operate the key using the display section and hear sounds associated with displays on the display section.

In addition to the above arrangement, the portable device of the present invention may be arranged such that a shock-absorbing member may be provided at a corner of the second housing that contacts the first housing, when the second housing is rotated with respect to the hinge section and then the hinge section is moved with respect to the first housing.

According to this arrangement, the shock-absorbing member is provided for a portion of the second housing that contacts the first housing. Therefore, damage and scratches to the first housing and the second housing can be prevented even in the following cases. One case is that the second housing is rotated about the second rotation axis when the first housing and the second housing are moved partway about the first rotation axis. Another case is that the first housing and the second housing are moved about the first rotation axis when the second housing is rotated partway about the second rotation axis.

In addition to the above arrangement, the portable device of the present invention may be arranged such that the shock-absorbing member is made of material having lower hardness than material that the first housing is made of.

According to this arrangement, the material that the portion of the second housing that contacts the first housing is made of the material having lower hardness than the materials that the first housing is made of. Therefore, damage and scratches to the first housing and the second housing can be prevented even in the following cases. One case is that the second housing is rotated about the second rotation axis when the first housing and the second housing are moved partway about the first rotation axis. Another case is that the first housing and the second housing are moved about the first rotation axis when the second housing is rotated partway about the second rotation axis.

In addition to the above arrangement, the portable device of the present invention may be arranged such that the shock-absorbing member is made of an elastic material.

According to this arrangement, the portion of the second housing that contacts the fist housing is made of the elastic material having lower hardness than the materials that the first housing is made of. Therefore, damage and scratches to the first housing and the second housing can be prevented even in the following cases. One case is that the second housing is rotated about the second rotation axis when the first housing and the second housing are moved partway about the first rotation axis. Another case is that the first housing and the second housing are moved about the first rotation axis when the second housing is moved rotated partway about the second rotation axis.

In addition to the above arrangement, the portable device of the present invention may be arranged such that the display section displays a rotatable direction of the second housing with respect to the hinge section.

According to this arrangement, a rotatable direction of the second housing with respect to the hinge section is displayed on the display section or a rotation direction display section. Therefore, the user can easily recognize a rotatable direction of the second housing from the display as well as the shock-absorbing member. Thus, damage to the device, caused when the second housing is rotated in a wrong direction, can be further prevented.

In addition to the arrangement, the portable device of the present invention may be arranged such that the base has a microphone hole provided in the vicinity of the protrusion.

According to this arrangement, gaps are provided between the first housing and the hinge section, and between the hinge section and the second housing. Reducing the distance between the gaps and the microphone hole allows sounds to be easily received in the closed state of the portable device.

In addition to the above arrangement, the portable device of the present invention may be arranged such that the second housing has a receiver hole at an end opposed to an end where the hinge section is connected.

According to this arrangement, a certain gap can be provided between the receiver hole and the microphone hole, regardless of whether the portable device is closed or opened. Thus, the quality of a phone call using the receiver and the microphone can be improved.

As described above, the portable device of the present invention is arranged such that the first housing has a speaker hole provided at the protrusion, the second housing has a display section provided on at least one surface substantially parallel to the second rotation axis of the second housing Therefore, it is possible to create a situation in which a user can easily hear sounds associated with displays on the display section.

The present invention is not limited to the foregoing embodiment, and modifications can be varied in the scope of the claims. That is, the technical scope of the present invention also includes embodiments obtained by combining technical means that are modified within the scope of the claims as appropriate.

The present invention can be applied to folding portable devices (information terminal devices), such as folding portable telephones, folding PHSs®, folding PDAs, folding notebook computers, and folding word processors.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A portable device, comprising:
   a first housing having a base and a protrusion protruded from one end of the base, the base having a pair of opposing parallel side surfaces positioned on opposing outer sides of the base and the protrusion having a pair of opposing outer side surfaces, each outer side surface positioned corresponding to a respective one of the opposing parallel side surfaces of the base;

a hinge section including a central part and two ends connected to the central part forming a U-shape, each of the two U-shaped ends being positioned to sandwich the pair of opposing side surfaces of the protrusion with the hinge section being able to freely move about a first rotation axis, the pair of opposing side surfaces of the protrusion that are sandwiched by the two ends of the hinge section being opposing ends of the protrusion in a direction that the first rotation axis extends; and a second housing provided to the hinge section so as to freely rotate about a second rotation axis being substantially orthogonal to the first rotation axis, the first housing having a speaker hole provided at the protrusion, the second housing having a display section provided on at least one surface substantially parallel to the second rotation axis of the second housing, and the display section and the speaker hole being disposed on substantially a same surface when the portable device is opened and when the portable device is closed with the display section exposed outward.

2. The portable device according to claim 1, wherein the first housing has a speaker in an inner space that communicates between the base and the protrusion.

3. The portable device according to claim 2, wherein the first housing has (i) a shooting lens on an opposite surface of the first housing from a surface having the protrusion, and (ii) a camera section, provided between the speaker and the shooting lens, for capturing an image provided from the shooting lens.

4. The portable device according to claim 1, wherein the second housing has a key operation section on a same surface as a surface having the display section.

5. The portable device according to claim 1, wherein the first housing has a cross-shape key provided at the protrusion.

6. The portable device according to claim 1, wherein the second housing has a shock-absorbing member at its corner contacting the first housing when the hinge section is moved toward the first housing with the second housing rotated through 90 degrees with respect to the hinge section.

7. The portable device according to claim 6, wherein the shock-absorbing member is made of material having lower hardness than material that the first housing is made of.

8. The portable device according to claim 6, wherein the shock-absorbing member is made of an elastic material.

9. The portable device according to claim 1, wherein the display section displays a rotatable direction of the second housing with respect to the hinge section.

10. The portable device according to claim 1, wherein the base has a microphone hole provided in the vicinity of the protrusion.

11. The portable device according to claim 10, wherein the second housing has a receiver hole at an end opposed to an end where the hinge section is connected

* * * * *